(12) United States Patent
Shin et al.

(10) Patent No.: US 8,157,735 B2
(45) Date of Patent: Apr. 17, 2012

(54) ULTRASOUND SYSTEM AND METHOD OF PROVIDING ULTRASOUND IMAGES

(75) Inventors: Dong Kuk Shin, Seoul (KR); Sung Hoo Hong, Seoul (KR); Kwang Ju Lee, Seoul (KR)

(73) Assignee: Medison Co., Ltd., Kangwon-Do (KR)

( * ) Notice: Subject to any disclaimer, the term of this patent is extended or adjusted under 35 U.S.C. 154(b) by 701 days.

(21) Appl. No.: 12/341,993

(22) Filed: Dec. 22, 2008

(65) Prior Publication Data

US 2009/0171204 A1  Jul. 2, 2009

(30) Foreign Application Priority Data

Dec. 27, 2007 (KR) .................. 10-2007-0138608

(51) Int. Cl.
*A61B 8/00* (2006.01)
(52) U.S. Cl. ....................... 600/441; 600/440
(58) Field of Classification Search .............. 600/437, 600/441
See application file for complete search history.

(56) References Cited

U.S. PATENT DOCUMENTS

| 4,930,514 A | 6/1990 | Baba et al. |
|---|---|---|
| 2007/0038105 A1 | 2/2007 | Hyun |
| 2007/0049823 A1 | 3/2007 | Li |

FOREIGN PATENT DOCUMENTS

| JP | 11-000327 | 1/1999 |
|---|---|---|
| KR | 1998-067408 | 10/1998 |
| KR | 10-2007-0000561 | 1/2007 |

OTHER PUBLICATIONS

Korean Office Action issued in Korean Patent Application No. 10-2007-0138608, mailed Jan. 5, 2011.
European Search Report issued in European Patent Application No. EP 08022094.0 dated Apr. 6, 2011.

*Primary Examiner* — Michael Rozanski
(74) *Attorney, Agent, or Firm* — McDermott Will & Emery LLP

(57) ABSTRACT

The present invention relates to an ultrasound system for providing ultrasound images in a duplex mode. The ultrasound system comprises a transmission/reception unit for alternately transmitting a first ultrasound beam and a second ultrasound beam to a target object. The first and second ultrasound beams are transmitted for first and second time durations, respectively. The ultrasound system further comprises an image processing unit for forming a first diagnostic mode image based on echoes of the first ultrasound beam and a second diagnostic mode image containing a gap corresponding to the first time duration based on echoes of the second ultrasound beam. The image processing unit is further configured to perform gap filling based on edge points of the second diagnostic mode image to form a second diagnostic image with the gap removed.

12 Claims, 7 Drawing Sheets

US 8,157,735 B2

ULTRASOUND SYSTEM AND METHOD OF PROVIDING ULTRASOUND IMAGES

The present application claims priority from Korean Patent Application No. 10-2007-0138608 filed on Dec. 27, 2007, the entire subject matter of which is incorporated herein by reference.

BACKGROUND OF THE INVENTION

1. Technical Field

The present invention generally relates to ultrasound systems, and more particularly to an ultrasound system and a method of providing ultrasound images in a duplex mode.

2. Background Art

An ultrasound system has become an important and popular diagnostic tool due to its non-invasive and non-destructive nature. Modern high-performance ultrasound imaging diagnostic devices and techniques are commonly used to produce two- or three-dimensional images of internal features of patients.

Nowadays, the ultrasound system operates in a duplex mode for simultaneously providing ultrasound images in two or more diagnostic modes. For example, the ultrasound system may provide a BD-mode image with a blood flow or movement of a target object indicated. The BD-mode is a diagnostic mode for providing a brightness (B)-mode image and a Doppler (D)-mode image at the same time. The D-mode image may include a spectral Doppler image formed based on Doppler signals, which are obtained from a sample volume set on the B-mode image. The D-mode image may indicate information regarding the moving direction and velocity of a blood flow or moving object. In the spectral Doppler image, a horizontal axis may represent time while a vertical axis represents velocity (or frequency).

In order to obtain the BD-mode image, the ultrasound system may alternately transmit a first ultrasound beam for obtaining the B-mode image and a second ultrasound beam for obtaining the D-mode image. The second ultrasound beam may not be transmitted while the first ultrasound beam is transmitted in the BD-mode. As such, a pulse repetition frequency (PRF) for the second ultrasound pulse may increase. As a result, a velocity scale in the spectral Doppler image may be lowered so that a detectable maximum velocity of a blood flow may be decreased. In order to solve the above problem, the first ultrasound beam may be transmitted for a first predetermined time duration. Then, the second ultrasound pulse may be transmitted for a second predetermined time duration. In such a case, however, the second ultrasound beam may not be transmitted for the first predetermined time duration for transmitting the first ultrasound beam. Thus, a gap corresponding to the first predetermined time duration may occur in the D-mode image.

DETAILED DESCRIPTION OF THE INVENTION

Figure 1:
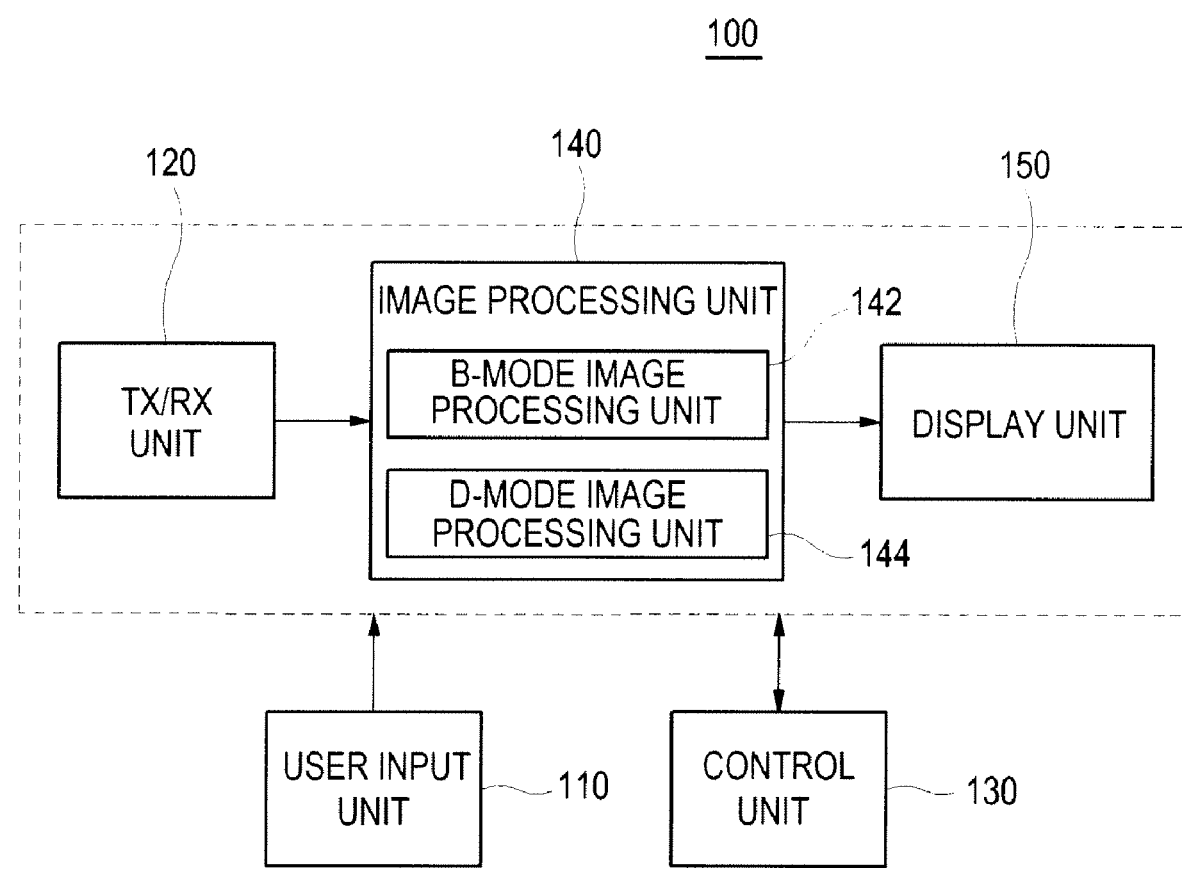
FIG. 1 is a block diagram showing an ultrasound system in accordance with one embodiment of the present invention.

FIG. 1 is a block diagram showing an ultrasound system in accordance with one embodiment of the present invention. The ultrasound system 100 may include a user input unit 110 allowing a user to input instructions. The instructions may include a setup instruction for setting a sample volume on a B-mode image. The setup instruction may include information about the position and size of the sample volume. The input unit 110 may be an arbitrary input device such as a mouse, a keyboard, a track ball, etc.

The ultrasound system 100 may further include a transmission/reception unit 120 configured to generate ultrasound beams. The ultrasound beams may be transmitted to a target object. The transmission/reception unit 120 may be further configured to convert ultrasound echoes reflected from a target object into electrical receive signals.

The ultrasound system 100 may further include a control unit 110 configured to generate control signals for controlling the generation of ultrasound beams in the transmission/reception unit 110. The control signals may include a first control signal for controlling the generation of an ultrasound beam for obtaining a B-mode image ("first ultrasound beam"). Also, the control signals may further include a second control signal for controlling the generation of an ultrasound beam for obtaining a D-mode image ("second ultrasound beam"). The second control signal may be generated based on the setup instruction inputted through the user input unit 110. Although it is described that the first ultrasound beam is transmitted for obtaining the B-mode image in one embodiment, the obtainable image is not limited to the B-mode image. In another embodiment, a motion mode image or a color mode image may be obtained based on the first ultrasound beam.

Figure 2:
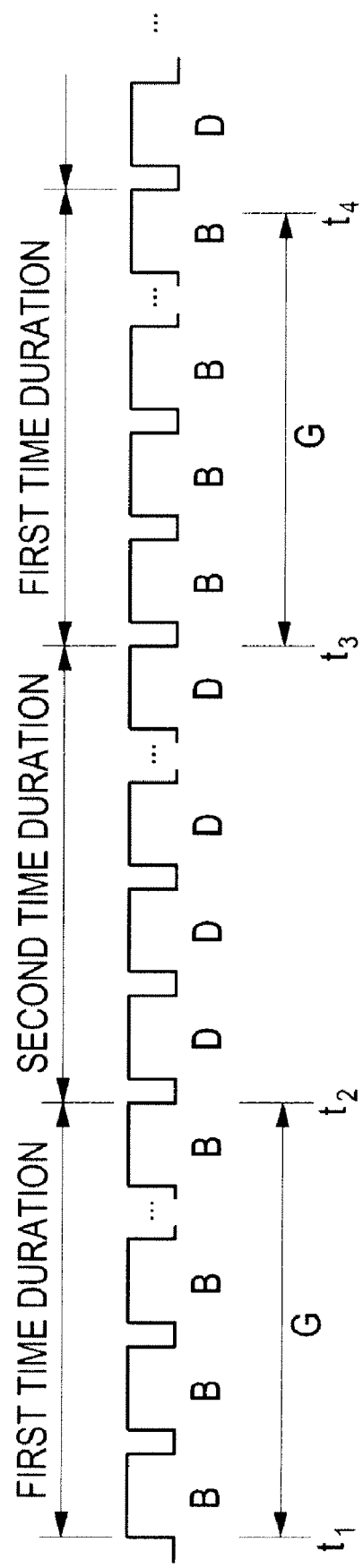
FIG. 2 is a timing diagram showing an example of alternately transmitting a first ultrasound beam and a second ultrasound beam in a duplex mode.

The control unit 130 may generate the control signals such that the first ultrasound beam is transmitted for a predetermined time duration ("first time duration") and the second ultrasound beam is transmitted for a predetermined time duration ("second time duration"), as illustrated in FIG. 2. A symbol "G" in FIG. 2 may represent a gap corresponding to the first time duration $t_1$-$t_2$ or $t_3$-$t_4$ in the D-mode image.

The transmission/reception unit 110 may be configured to transmit the first ultrasound beam to the target object in response to the first control signal and form receive signals based on ultrasound echoes reflected from the target object. Also, the transmission/reception unit 110 may transmit the second ultrasound beam to the sample volume in response to the second control signal and form spectral Doppler signals based on ultrasound echoes reflected from the sample volume.

The ultrasound system 100 may further include an image processing unit 140. The image processing unit 140 may include a B-mode image processing unit 142 and a D-mode image processing unit 144. The B-mode image processing unit 142 may be configured to form a B-mode image based on the receive signals. The D-mode image processing unit 144 may form a D-mode image (i.e., spectral Doppler image) based on the spectral Doppler signals. The D-mode image processing unit 144 may be further configured to extract edge points from the D-mode image and estimate edge points at a gap corresponding to the first time duration in the D-mode image. The D-mode image processing unit 144 may perform gap filling for the gap based on the estimated edge points.

Figure 3:
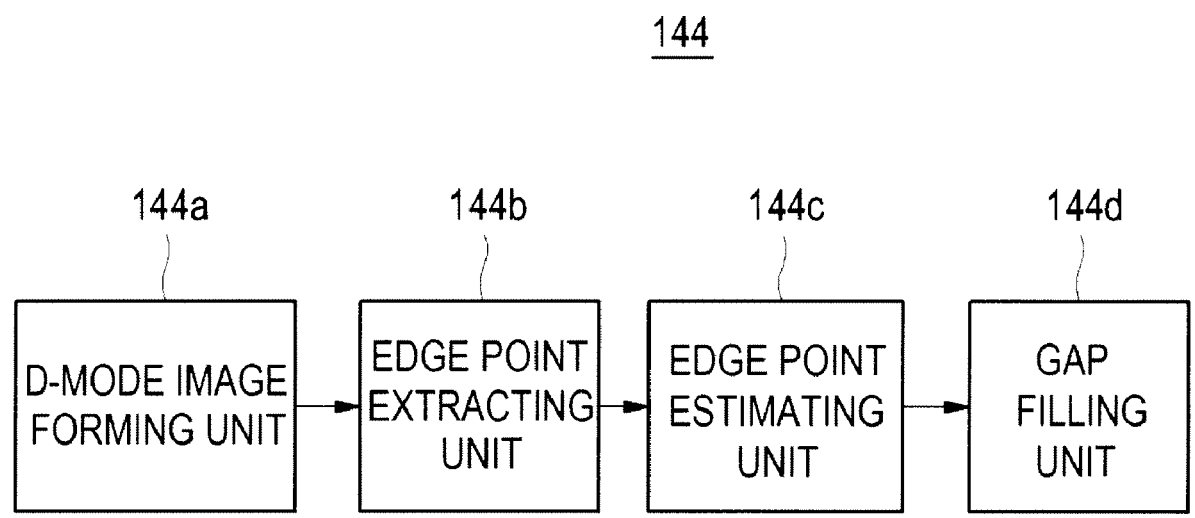
FIG. 3 is a block diagram showing a D-mode image processing unit in accordance with one embodiment of the present invention.

FIG. 3 is a block diagram showing an embodiment of the D-mode image processing unit 144. The D-mode image processing unit 144 may include a D-mode image forming unit 144a, an edge point extracting unit 144b, an edge point estimating unit 144c and a gap filling unit 144d.

Figure 4:
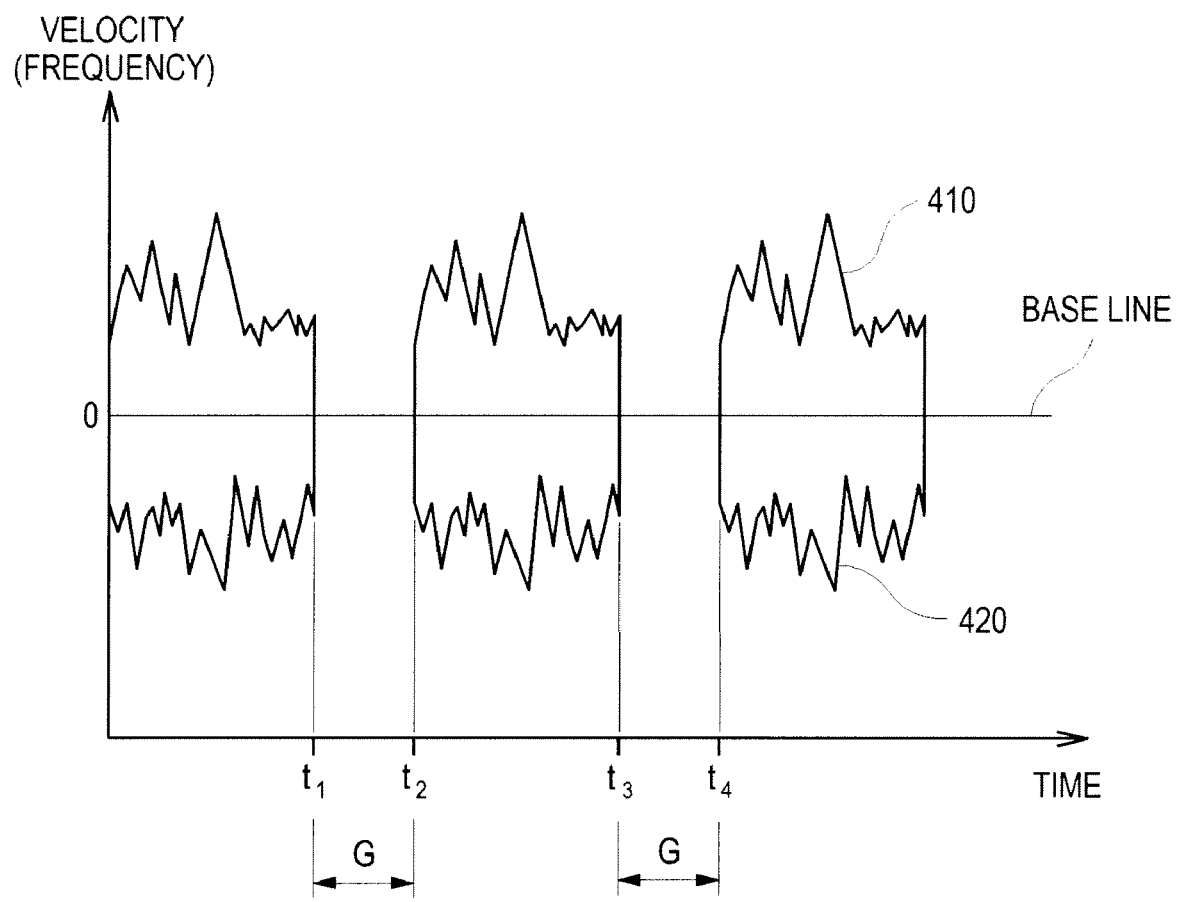
FIG. 4 is a schematic diagram showing an example of a D-mode image.

The D-mode image forming unit 144a may be configured to form a D-mode image containing gaps G occurring when transmitting the first ultrasound beam for the first time duration, as illustrated in FIG. 4. In the D-mode image, a horizontal axis may represent time and a vertical axis may represent velocity (or frequency).

The edge point extracting unit 144b may extract edge points from the D-mode image. The edge points may be extracted based on a variation of brightness values determined by a differential operator. For example, the edge points may be extracted by using an edge mask such as Sobel, Prewitt, Robert, Laplacian of Gaussian, Canny, etc. In one embodiment, the edge point extracting unit 144b may extract first edge points of Doppler spectra having a greater scale than a base line scale ("upper Doppler spectra 210") on the velocity axis from the D-mode image. Also, the edge point extracting unit 144b may be configured to extract second edge points of Doppler spectra having a less scale than a base line scale ("lower Doppler spectra 220") on the velocity axis from the D-mode image. Some first and second edge points may exist on an identical straight line perpendicular to the base line.

Figure 5A:
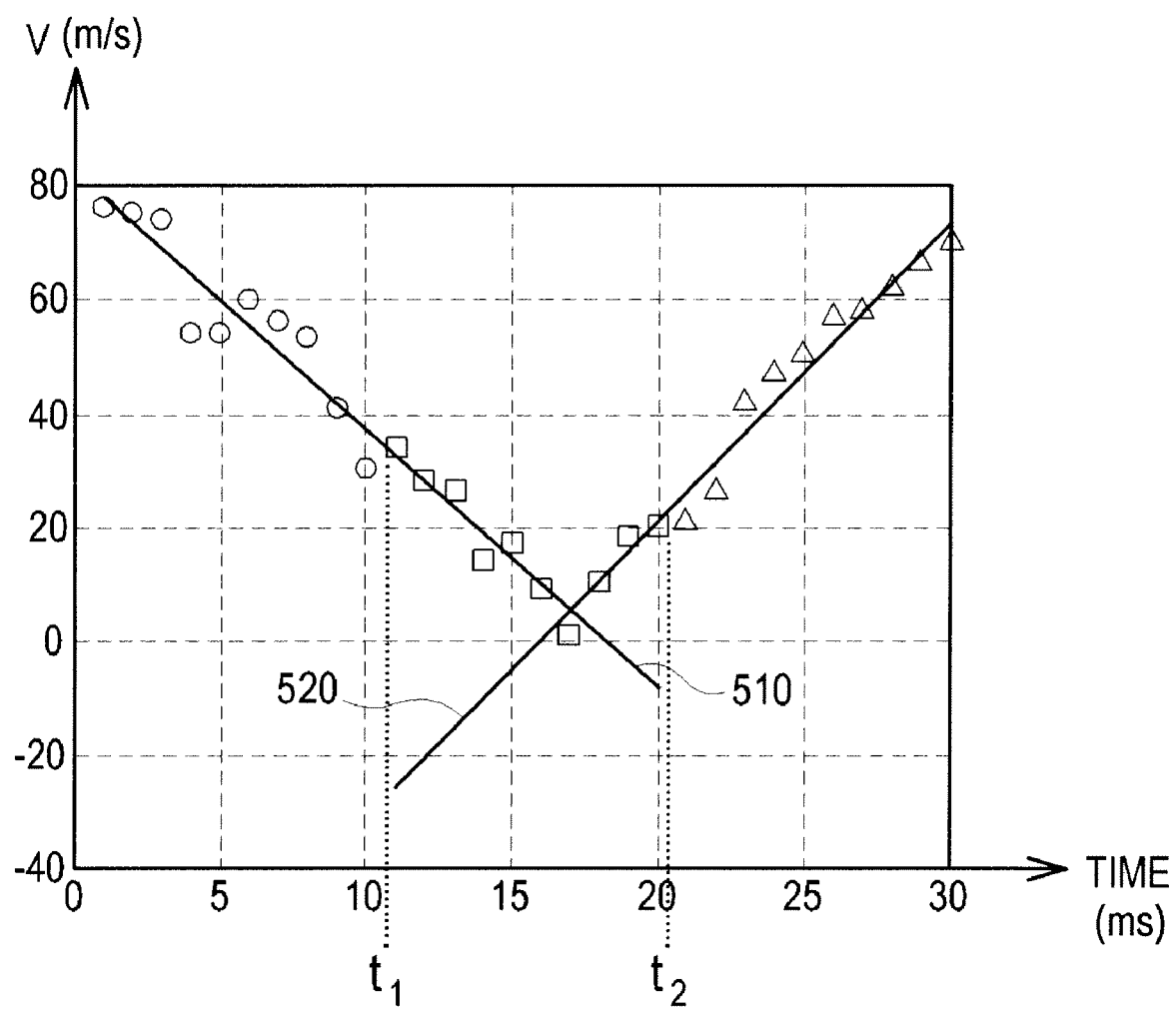
FIG. 5A is a graph showing examples of first degree polynomial curves.

The edge point estimating unit 144c may be configured to compute a polynomial curve of the extracted edge points to thereby estimate edge points within the gap. In one embodiment, the edge point estimating unit 144c may compute a first degree polynomial curve 510 by using first edge points (denoted by a circle) positioned at a left side of the gap G, i.e., prior to the gap G. The edge point estimating unit 114c may be further configured to compute a first degree polynomial curve 520 by using first edge points (denoted by a triangle) positioned at a right side of the gap G, i.e., posterior to the gap G. The edge point estimating unit 114c may check whether two first degree polynomial curves 510 and 520 intersect. If two first degree polynomial curves 510 and 520 intersect, then the edge point estimating unit 144c may compute a variance of the first edge points prior to the gap G and a variance of the first edge points posterior to the gap G. The edge point estimating unit 144c may estimate the first edge points (denoted by rectangle) within the gap G based on the computed variances and two first degree polynomial curves 510 and 320, as shown in FIG. 5A.

Figure 5B:
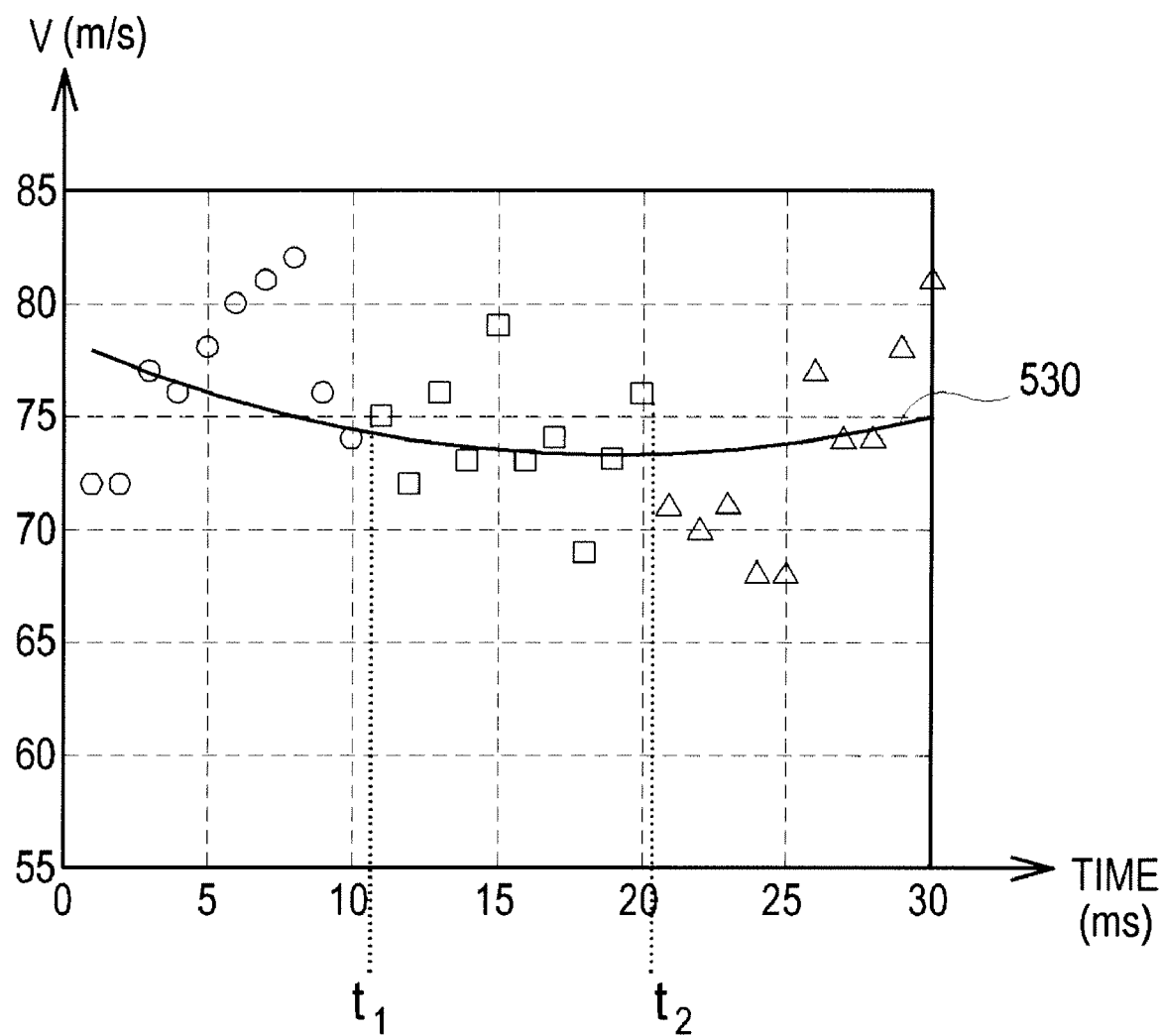
FIG. 5B is a graph showing an example of a second degree polynomial curve.

If the two first degree polynomial curves 510 and 520 do not intersect, then the edge point estimating unit 144c may compute a second degree polynomial curve 530 by using the first edge points (denoted by a circle) prior to the gap G and the first edge points (denoted by a triangle) posterior to the gap G and variance of the first edge points, as illustrated in FIG. 5B. The edge point estimating unit 144c may estimate the first edge points (denoted by a rectangle) within the gap G based on the computed variance and the second degree polynomial curve 330. The edge point estimating unit 144c may be further configured to estimate the second edge points for the lower Doppler spectra within the gap G in the same manner as the first edge points.

Figure 6:
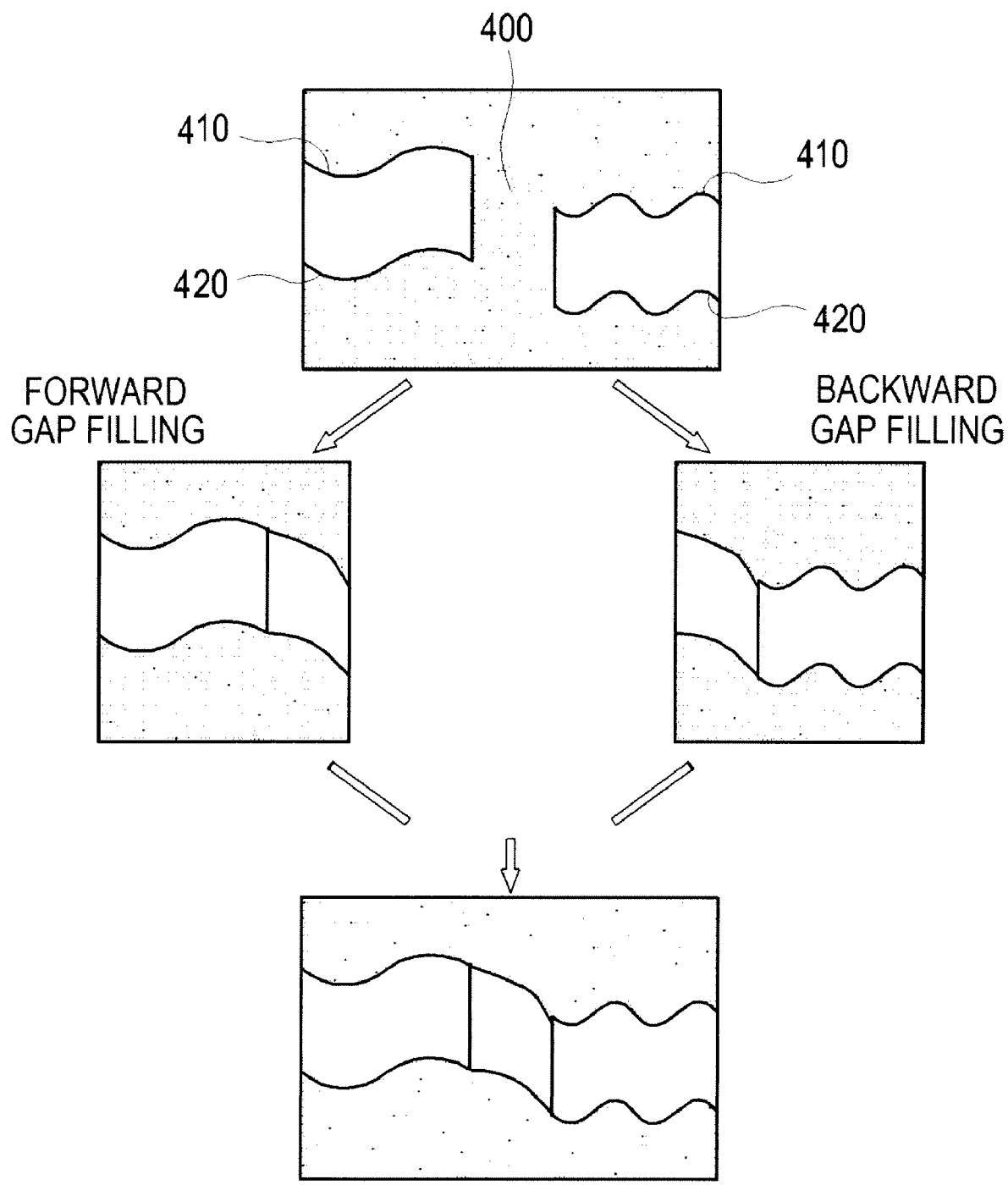
FIG. 6 is a schematic diagram illustrating an example of gap filling.

The gap filling unit 144d may be configured to perform gap filling based on the estimated edge points within the gap G and Doppler spectra neighboring the gap G. The gap filling unit 144d may use a linear interpolation method for the gap filling. In one embodiment, the gap filling unit 144d may perform gap filling for a gap 400 by linearly interpolating the first estimated edge points and the second estimated edge points starting from the Doppler spectra 410 and 420 prior to the gap G ("forward gap filling"), thereby forming a D-mode image with the gap filled, as shown in FIG. 6. Also, the gap filling unit 144d may perform gap filling for the gap 400 by linearly interpolating the first estimated edge points and the second estimated edge points starting from the Doppler spectra 410 and 420 posterior to the gap G ("backward gap filling"), thereby forming a D-mode image with the gap filled. The gap filling unit 144d may synthesize the D-mode images obtained through the forward gap filling and the backward gap filling to thereby form a final D-mode image. A display unit 140 may display the B-mode image and the D-mode image processed by the image processing unit 130.

Although it is described that the final D-mode image is formed by synthesizing the D-mode images obtained through the forward gap filling and the backward gap filling, the manner of forming the final D-mode image is not limited thereto. The final D-mode image may be merely formed by performing the forward gap filling or the backward gap filling.

According to one aspect of the present invention, there is provided an ultrasound system for providing ultrasound images in a duplex mode, comprising: a transmission/reception unit configured to alternately transmit a first ultrasound beam and a second ultrasound beam to a target object, wherein the first and second ultrasound beams are transmitted for first and second time durations, respectively; and an image processing unit configured to form a first diagnostic mode image based on echoes of the first ultrasound beam and a second diagnostic mode image containing a gap corresponding to the first time duration based on echoes of the second ultrasound beam, the image processing unit being further configured to perform gap filling based on edge points of the second diagnostic mode image to form a second diagnostic image with the gap removed.

According to another aspect of the present invention, there is provided a method of providing ultrasound images in a duplex mode in an ultrasound system, comprising: a) alternately transmitting a first ultrasound beam and a second ultrasound beam to a target object, wherein the first and second ultrasound beams are transmitted for first and second time durations, respectively; b) forming a first diagnostic mode image based on echoes of the first ultrasound beam and a second diagnostic mode image containing a gap corresponding to the first time duration based on echoes of the second ultrasound beam; and c) performing gap filling based on edge points of the second diagnostic mode image to provide a second diagnostic mode image with the gap removed.

Any reference in this specification to "one embodiment," "an embodiment," "example embodiment," etc. means that a particular feature, structure or characteristic described in connection with the embodiment is included in at least one embodiment of the present invention. The appearances of such phrases in various places in the specification are not necessarily all referring to the same embodiment. Further, when a particular feature, structure or characteristic is described in connection with any embodiment, it is submitted that it is within the purview of one skilled in the art to effect such feature, structure or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An ultrasound system for providing ultrasound images in a duplex mode, comprising:
 a transmission/reception unit for alternately transmitting a first ultrasound beam and a second ultrasound beam to a target object, wherein the first and second ultrasound beams are transmitted for first and second time durations, respectively; and
 an image processing unit for forming a first diagnostic mode image based on echoes of the first ultrasound beam and a second diagnostic mode image containing a gap corresponding to the first time duration based on echoes of the second ultrasound beam, the image processing unit being configured to perform gap filling based on edge points of the second diagnostic mode image to form a second diagnostic mode image with the gap removed,
 wherein the second diagnostic mode image includes a Doppler mode (D-mode) image, and
 wherein the image processing unit includes:
  a D-mode image forming unit for forming the D-mode image;
  an edge point extracting unit for extracting the edge points from the D-mode image;
  an edge point estimating unit for computing a polynomial curve of the extracted edge points to estimate edge points within the gap; and
  a gap filling unit for performing the gap filling for the gap based on the estimated edge points and Doppler spectra neighboring to the gap in the D-mode image.

2. The ultrasound system of claim 1, wherein the first diagnostic mode image includes at least one of a brightness mode image, a motion mode image and a color mode image.

3. The ultrasound system of claim 1, wherein the edge point estimating unit is configured to perform steps of:
 computing first degree polynomial curves by using the edge points before and after the gap;
 checking whether the first degree polynomial curves intersect;
 if the first degree polynomial curves intersect, computing variances of the edge points before and after the gap; and
 estimating the edge points within the gap based on the computed variances and the first degree polynomial curves.

4. The ultrasound system of claim 3, wherein the edge point estimating unit is configured to perform steps of:
 if the first degree polynomial curves do not intersect, computing a second degree polynomial curve by using the edge points before and after the gap;
 computing variances of the edge points before and after the gap; and
 estimating the edge points within the gap based on the computed variances and the second degree polynomial curve.

5. The ultrasound system of claim 4, wherein the gap filling unit is configured to perform steps of:
 performing a forward gap filling for the gap formed by the estimated edge point from Doppler spectra prior to the gap to form a D-mode image with the gap removed;
 performing a backward gap filling for the gap formed by the estimated edge point from Doppler spectra posterior to the gap to form a D-mode image with the gap removed; and
 synthesizing the D-mode images formed through the forward and backward gap filling.

6. The ultrasound system of claim 5, wherein the gap filling is performed by using a linear interpolation method.

7. A method of providing ultrasound images in a duplex mode in an ultrasound system, comprising:
 a) alternately transmitting a first ultrasound beam and a second ultrasound beam to a target object, wherein the first and second ultrasound beams are transmitted for first and second time durations, respectively;
 b) forming a first diagnostic mode image based on echoes of the first ultrasound beam and a second diagnostic mode image containing a gap corresponding to the first time duration based on echoes of the second ultrasound beam; and
 c) performing gap filling based on edge points of the second diagnostic mode image to provide a second diagnostic mode image with the gap removed,
 wherein the second diagnostic mode image includes a Doppler mode (D-mode) image, and
 wherein the step c) includes:
  c1) forming the D-mode image;
  c2) extracting the edge points from the D-mode image;
  c3) computing a polynomial curve of the extracted edge points to estimate edge points within the gap; and
  c4) performing the gap filling for the gap based on the estimated edge points and Doppler spectra neighboring the gap in the D-mode image.

8. The method of claim 7, wherein the first diagnostic mode image includes at least one of a brightness mode image, a motion mode image and a color mode image.

9. The method of claim 8, wherein the step c3) includes:
 computing first degree polynomial curves by using the edge points before and after the gap;
 checking whether the first degree polynomial curves intersect;
 if the first degree polynomial curves intersect, computing variances of the edge points before and after the gap; and
 estimating the edge points within the gap based on the computed variances and the first degree polynomial curves.

10. The method of claim 9, wherein the step c3) further includes:
 if the first degree polynomial curves do not intersect, computing a second degree polynomial curve by using the edge points before and after the gap;
 computing variances of the edge points before and after the gap; and
 estimating the edge points within the gap based on the computed variances and the second degree polynomial curve.

11. The method of claim 10, wherein the step c4) includes:
 performing a forward gap filling for the gap formed by the estimated edge point from Doppler spectra prior to the gap to form a D-mode image with the gap removed;
 performing a backward gap filling for the gap formed by the estimated edge point from Doppler spectra posterior to the gap to form a D-mode image with the gap removed; and
 synthesizing the D-mode images formed through the forward and backward gap filling.

12. The method of claim 11, wherein the gap filling is performed by using a linear interpolation method.

* * * * *